(12) United States Patent
Kenmotsu

(10) Patent No.: US 12,403,763 B2
(45) Date of Patent: Sep. 2, 2025

(54) COAXIAL DRIVE UNIT

(71) Applicant: GKN Automotive Limited, Birmingham (GB)

(72) Inventor: Kazuto Kenmotsu, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/956,446

(22) Filed: Nov. 22, 2024

(65) Prior Publication Data

US 2025/0083517 A1   Mar. 13, 2025

Related U.S. Application Data

(63) Continuation of application No. PCT/JP2022/028703, filed on Jul. 26, 2022.

(51) Int. Cl.
*B60K 7/00* (2006.01)
*B60K 1/00* (2006.01)
(Continued)

(52) U.S. Cl.
CPC .............. *B60K 17/165* (2013.01); *B60K 1/00* (2013.01); *B60K 17/02* (2013.01);
(Continued)

(58) Field of Classification Search
CPC ........ B60K 17/165; B60K 1/00; B60K 17/02; B60K 2001/001; B60K 2007/0092;
(Continued)

(56) References Cited

U.S. PATENT DOCUMENTS

2014/0262675 A1   9/2014 Sugiyama et al.
2018/0180150 A1*  6/2018 Hiyoshi ................ F16D 63/006
(Continued)

FOREIGN PATENT DOCUMENTS

EP   2644429 A1 * 10/2013 ............... B60K 1/00
JP   2021167636 A   10/2021
(Continued)

OTHER PUBLICATIONS

Written Opinion & International Search Report for PCT/JP2022/028703 dated Oct. 18, 2022, (7 pages).
(Continued)

*Primary Examiner* — Justin Holmes
(74) *Attorney, Agent, or Firm* — Reising Ethington P.C.

(57) ABSTRACT

A coaxial drive unit is provided with a motor coaxial with a first axis. The drive unit has a differential that is coaxial with the first axis and includes a differential gear set for differential torque transmission to paired axles, an output shaft driven by the motor to rotate about the first axis and having a through-hole that allows one of the paired axles to reach the differential from an exterior. A transmission shaft is rotatable about a second axis parallel with the first axis and in mesh with both the output shaft and the differential to transmit the torque from the motor to the differential, a clutch is disposed between the motor and the differential gear set to limit a differential motion or disconnectably connect the output shaft with the differential, and an actuator is disposed above the first axis and configured to drive the clutch.

4 Claims, 5 Drawing Sheets

(51) Int. Cl.
  *B60K 17/02*   (2006.01)
  *B60K 17/16*   (2006.01)
  *F16H 48/34*   (2012.01)

(52) U.S. Cl.
  CPC .................. *B60K 2001/001* (2013.01); *B60K 2007/0092* (2013.01); *F16H 48/34* (2013.01); *F16H 2048/343* (2013.01)

(58) Field of Classification Search
  CPC .................. B60K 17/16; F16H 48/34; F16H 2048/343; H02K 7/10
  See application file for complete search history.

(56) References Cited

U.S. PATENT DOCUMENTS

| | | |
|---|---|---|
| 2020/0318693 A1 | 10/2020 | Lee |
| 2021/0317901 A1 | 10/2021 | Oowada et al. |

FOREIGN PATENT DOCUMENTS

| | | | | |
|---|---|---|---|---|
| JP | 2022527554 A | 6/2022 | | |
| WO | WO2013076878 A1 | 5/2013 | | |
| WO | WO-2014011230 A1 * | 1/2014 | ............... | B60K 1/00 |
| WO | WO-2019228639 A1 * | 12/2019 | ............... | B60K 1/00 |
| WO | WO2021004780 A1 | 1/2021 | | |

OTHER PUBLICATIONS

English Translation—International Search Report for PCT/JP2022/028703 dated Oct. 18, 2022, (2 pages).

* cited by examiner

COAXIAL DRIVE UNIT

CROSS REFERENCE TO RELATED APPLICATIONS

This application is a continuation Application of PCT International Application No. PCT/JP2022/028703 filed on Jul. 26, 2022, the entire contents of which are incorporated herein by reference.

TECHNICAL FIELD

The disclosure herein relates to a coaxial drive unit to be mainly applied to driving wheels of an electric vehicle, which can be coaxial with axles of the driving wheels and hardly affected by pebbles, dirt or water incoming from the road.

BACKGROUND

In the field of vehicle technology, many techniques are under study for replacement of internal combustion engines with electric motors. It is possible to directly couple a motor with axles to drive a vehicle but use of a sufficiently powerful motor is required. Considering its weight and cost, this is hardly said to be a practical solution. Normally, a moderate-powered (i.e., compact) motor is used in combination with a multi-stage reduction gear set to create multiplied torque for driving a vehicle.

A drive unit formed of a combination of a gear box with a reduction gear set and a motor generally extends largely beyond axles as exemplarily shown in PCT International Publication WO 2013/076878 A1. Such a large size must decrease the benefit obtained by use of a compact motor. PCT International Publication WO 2021/004780 A1 proposes a drive unit that can be arranged coaxially with axles.

SUMMARY

A motor extending largely beyond axles, because of its largeness, rather works well for protecting electric components of its own from pebbles, dirt or water coming from the road. The reason is that the electric components can hide behind the motor as long as the components are disposed everywhere except a lower side of the motor open to the road. In the drive unit disclosed in WO 2021/004780 A1, however, such beneficial locations are barely found, or even if found, such locations would not be necessarily available for the electric components. The drawings in the same for example illustrate that an actuator for driving a decoupling unit 7 is disposed below an oil level 11 and is apparently close to the road. Assuming that the device is turned upside down, the decoupling unit 7 comes around the left end of the device and then the actuator necessarily projects and is exposed axially outward from the drive unit. It is apparent that the actuator cannot avoid incoming substances from the road.

In the device disclosed below, a plurality of elements are rearranged and therefore the present disclosure provides a coaxial drive unit, an actuator of which can avoid incoming substances from the road.

A coaxial drive unit for driving paired axles rotatable about a first axis, is provided with: a motor coaxial with the first axis; a differential coaxial with the first axis and rotatable about the first axis, the differential including a differential gear set configured to differentially output received torque to the paired axles; an output shaft penetrating and driven by the motor to rotate about the first axis, the output shaft having a through-hole so dimensioned as to allow one of the paired axles to reach the differential from an exterior; a transmission shaft rotatable about a second axis parallel with the first axis and in mesh with both the output shaft and the differential to transmit the torque from the motor to the differential; a clutch disposed between the motor and the differential gear set to limit a differential motion of the differential gear set or disposed on the transmission shaft to disconnectably connect the output shaft with the differential; and an actuator disposed above the first axis and configured to drive the clutch.

BRIEF DESCRIPTION OF THE DRAWINGS

The following detailed description of certain embodiments and best mode will be set forth with reference to the accompanying drawings, in which.

DETAILED DESCRIPTION

Exemplary embodiments will be described hereinafter with reference to the appended drawings. In the following description and appended claims, the term "parallel" means parallel in the ordinary geometric meaning, i.e., coplanar but not intersecting, and necessarily excludes identity to each other. Further, forward, rearward, upward and downward are defined on the basis of a state where the device is incorporated in a vehicle. Drawings are not necessarily made to scale and therefore it is particularly noted that dimensional relations are not limited to those drawn therein.

A coaxial drive unit according to the present embodiment as described below is generally used to drive paired axles respectively extending rightward and leftward. The uses are not limited thereto, and the unit is also used for driving almost any device which is energized by torque supplied through a shaft.

Figure 1:
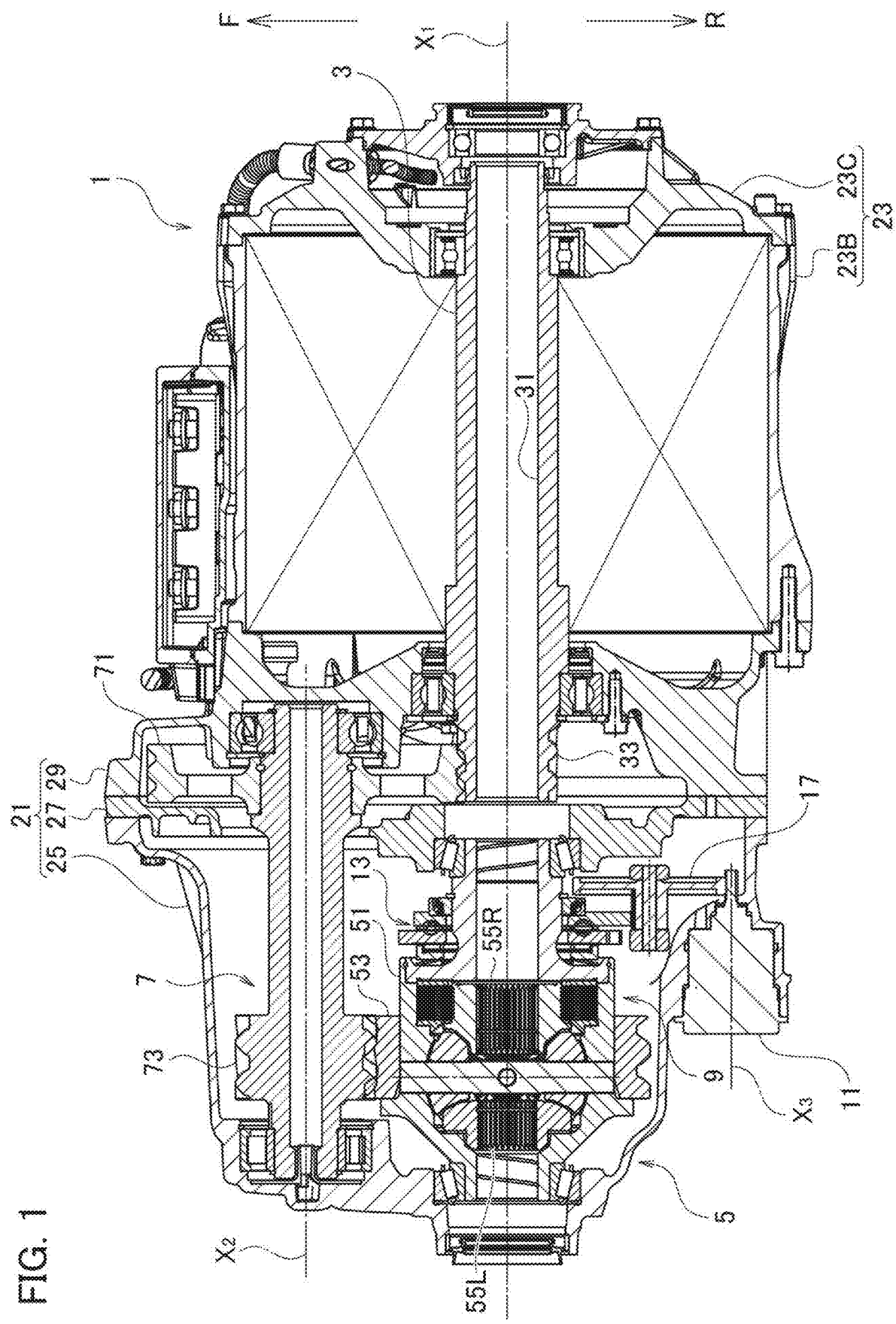
FIG. 1 is a sectional view of a coaxial drive unit according to an embodiment, taken from a plane passing through axes of respective elements.

Referring to FIG. 1, an arrow F depicts forward and an arrow R depicts rearward. First, second and third axes X1, X2 and X3 are mutually parallel and perpendicular to a longitudinal direction of a vehicle. The paired axles lie along the first axis X1 and are respectively elongated rightward and leftward, although not shown therein.

The coaxial drive device is in general provided with a motor 1 for creating torque, an output shaft 3 for outputting the torque, a differential 5 for differentially outputting the received torque to the paired axles, a transmission shaft 7 for intermediating the output shaft 3 and the differential 5, a clutch 9 for limiting differential motion of the differential 5, and an actuator 11 for actuating the clutch 9. Although the motor 1 and the differential 5 are coaxial and mutually adjoining, there's no direct connection therebetween and the transmission shaft 7 about the axis distinct therefrom serves for torque transmission therebetween. The arrangement of these elements is advantageous in reducing sizes in both the longitudinal direction and the lateral direction.

These elements are as a whole housed in and supported by casings 21, 23, while the casing 23 housing the motor 1 and the casing 21 housing mainly the differential 5 and the transmission 7 may be separate bodies and mutually combinable. This is beneficial in efficient production because assembly of the motor 1 and assembly of the other elements can be separately carried out and thereafter mutually combined to finish assembly of the unit as a whole. Each casing 21, 23 may be designed to be further dividable into a plurality of elements. For example, the casing 21 may be dividable into a main body 25 and covers 27, 29, and the casing 23 may be also dividable into a main body 23B and a cover 23C. Related description will be given later.

The motor 1 is, according to the example shown in the drawing, disposed rightward off-center in the coaxial drive unit. Of course, contrary to the example, the motor 1 may be disposed leftward. In any case, the motor 1 is coaxial with the first axis X1 and is provided with a stator formed of an electromagnet and a rotor receiving its magnet flux to rotate about the axis in order to create rotational force about the axis. The electromagnet is further connected through a controller to a battery of the vehicle to controllably set the rotor in rotational motion.

The output shaft 3 penetrates the motor 1 and is drivingly coupled to the rotor within the motor 1 to receive the rotational force therefrom, thereby rotating about the first axis X1. One end of the output shaft 3 is close to a rightmost end of the casing 23 and the other end is exposed in the casing 21 and has gear teeth 33. The gear teeth 33, by meshing with a gear wheel 71 as described later, outputs the rotational force to the transmission shaft 7. The output shaft 3 around its one end may be supported by the cover 23C and the other end may be supported by the cover 29.

The output shaft 3 is formed to be totally hollow, and is more specifically provided with a through-hole 31 elongated along the first axis X1 from the one end to the other end. The through-hole 31 is so dimensioned that one of the paired axles, the right axle in the illustrated example, passes through the through-hole 31 and reaches and is coupled with the differential 5.

The transmission shaft 7, not coaxial with the output shaft 3, is supported by the casing 21 so as to rotate about the second axis X2. One end of the transmission shaft 7 may extend over and project from the cover 27 for example, thereby being supported by the cover 29. When the one end of the transmission shaft 7 and the other end of the output shaft 3 are commonly supported by the cover 29, it is advantageous in stabilizing the mutual relation and the gear engagement. The other end of the transmission shaft 7 may be supported by the main body 25.

The transmission shaft 7 is, around the one end, provided with the gear wheel 71 meshing with the gear teeth 33 and is, around the other end, provided with a gear section 73 for example to mesh with a ring gear 53 as described later. The gear section 73 is smaller in diameter than the gear wheel 71 so that the combination of these gears constitutes a reduction gear set for reducing rotation speed (multiplying its torque) of the motor 1 and outputting the multiplied torque to the differential 5. Further, although not essential, the gear section 73 may be a unitary body with the transmission shaft 7 as shown in the drawing for the convenience of easy assembly, and the gear wheel 71 may be a separate body and coupled to the transmission shaft 7 by press-fitting, welding or spline-coupling.

In the above descriptions, the reduction gear set has a gear set of only two stages but a multi-stage design is applicable. Moreover, in place of speed reduction by the combination of the smaller gear and the larger gear, any gear set capable of speed reduction is applicable, examples of which are an externally meshing gear set, an internally meshing gear set, a planetary gear set and a harmonic drive gear set, and still alternatively a gear set of any combination of these gear sets is applicable.

The differential 5 is coaxial with the output shaft 3 and is supported by the casing 21 so as to rotate about the first axis X1. One end of the differential 5 is for example supported by the first cover 27 and close to the other end of the output shaft 3, and the other end of the differential 5 is supported by the main body 25. Where the other end of the differential 5 and the other end of the transmission shaft 7 are commonly supported by the main body 25, this is advantageous in stabilizing the mutual relation and the gear engagement.

The differential 5 is provided with a differential case 51 that supports a differential gear set and its ring gear 53 is fixed to a periphery of the differential 51 for example, so that the differential case 51 and the ring gear 53 are unitarily rotated by torque received through the gear engagement. Alternatively, the ring gear 53 and the differential case 51 may be formed as a unitary body.

Although the example shown in the drawing relates to a differential gear set of a bevel gear type, instead any other type such as a face gear type or a planetary gear type is applicable. In any case, the differential gear set transmits the torque received by the differential case 51 to side gears 55R, 55L but is so configured as to allow differential motion between the side gears 55R, 55L. Both the side gears 55R, 55L are so structured as to couple with both axles respectively, and each may have a structure such as splines on its inner periphery for example. The left axle coupled with the left side gear 55L passes through the openings on the differential case 51 and the casing 21 and extends to the exterior, and the right axle coupled with the right side gear 55R passes through the through-hole 31 and the opening on the casing 23 and extends to the exterior, thereby coupling with left and right wheels respectively. As described already, the right and the left could be reversed as contrary to the drawing.

The clutch 9 is a device provided with a driving member and a driven member to transmit driving force therebetween, and normally the driving member and the driven member are commonly ring-like and arranged coaxially in line. In the present embodiment, the clutch 9 is disposed between the motor 1 and the differential gear set when viewed in the direction of the first axis X1, and is configured to limit the differential motion of the differential gear set. The clutch 9 is for example a multi-plate clutch, where one set of the plates is coupled with the right side gear 55R and the other set of the plates is coupled with the differential case 51. The alternately layered clutch plates, when being pressed, exert a braking force on the right side gear 55R relative to the differential case 51, thereby limiting the differential motion between the side gears 55R, 55L. Of course, in place of the multi-plate clutch, any friction clutch such as a cone clutch is possible. Or, in place of or in addition to the friction clutch, a dog clutch is applicable for example. The dog clutch gives a so-called differential lock function to the differential 5.

To apply a pressure force to the clutch 9, the coaxial drive unit is for example provided with a combination of an actuator 11 and a cam mechanism 13. The actuator 11 is disposed along the third axis X3 not coaxial with the axes X1, X2. The cam mechanism 13 is disposed between the motor 1 and the clutch 9.

Figure 2:
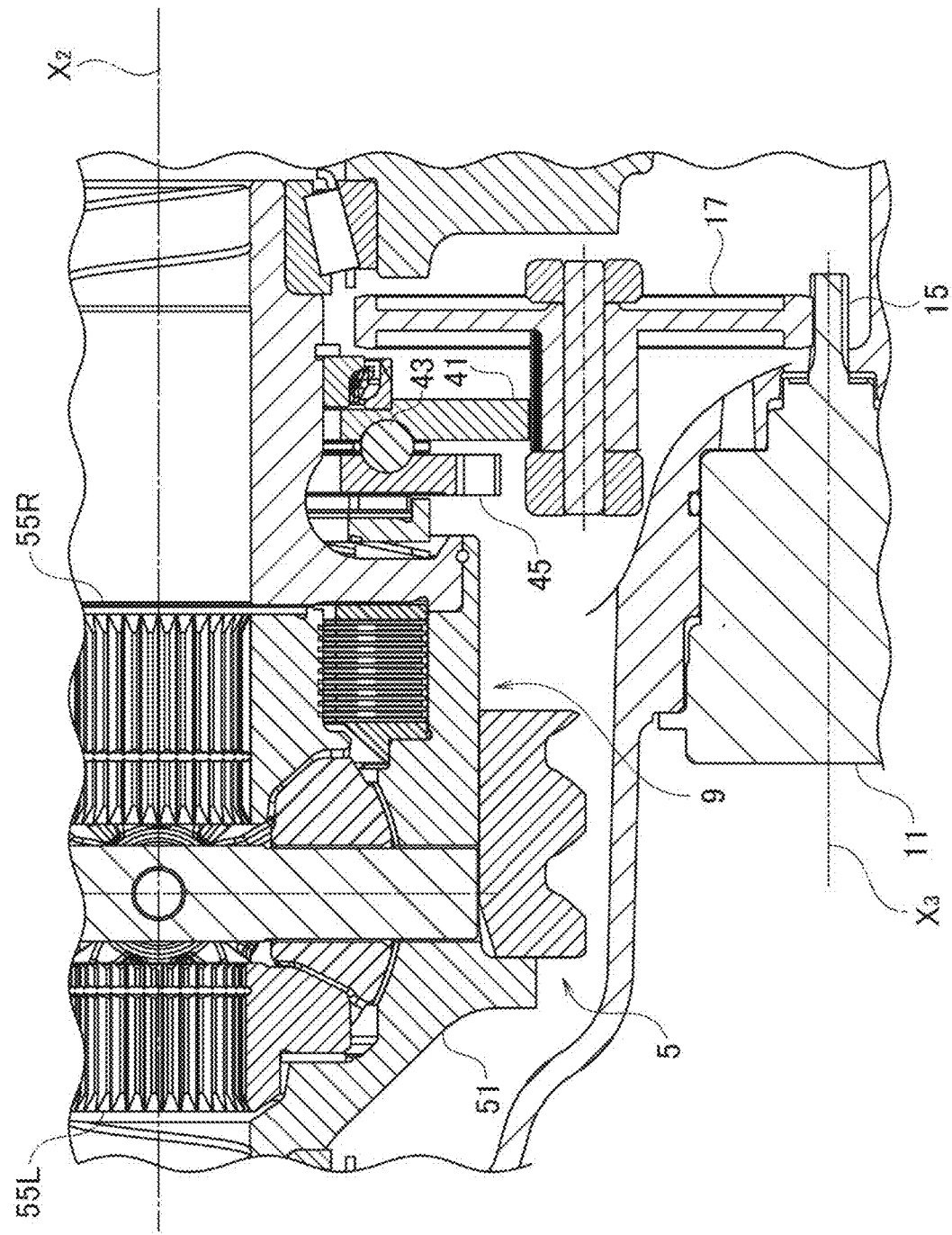
FIG. 2 is an enlarged sectional view of the device of FIG. 1 for mainly showing a clutch and an actuator.

Referring to FIG. 2 in combination with FIG. 1, the actuator 11 is a compact motor for example and has a gear shaft 15 for power output. The gear shaft 15 rotates about the third axis X3. The gear shaft 15 directly, or via a reduction gear 17, meshes with and drives a gear plate 41 of the cam mechanism 13.

The cam mechanism 13 is provided with a pressure plate 45 opposed to the gear plate 41 and a cam structure between the gear plate 41 and the pressure plate 45, which converts a rotational motion into an axial motion. The cam structure is for example slopes formed on one or both of the plates 41, 45 and cam balls 43 capable of rolling on the slopes. Rollers may be used in place of the cam balls, or another alternative is a combination of slopes on one plate and corresponding projections on the other plate, where the former slidably moves along the latter. In any case, the gear plate 41 is rotatable about the first axis X1 while the pressure plate 45 is prevented from rotating about the first axis X1 but axially movable. Therefore, when the actuator 11 rotates the gear plate 41, the intervening cam structure makes the pressure plate 45 move in the axial direction, thereby exerting a pressure force on the clutch 9.

Figure 3:
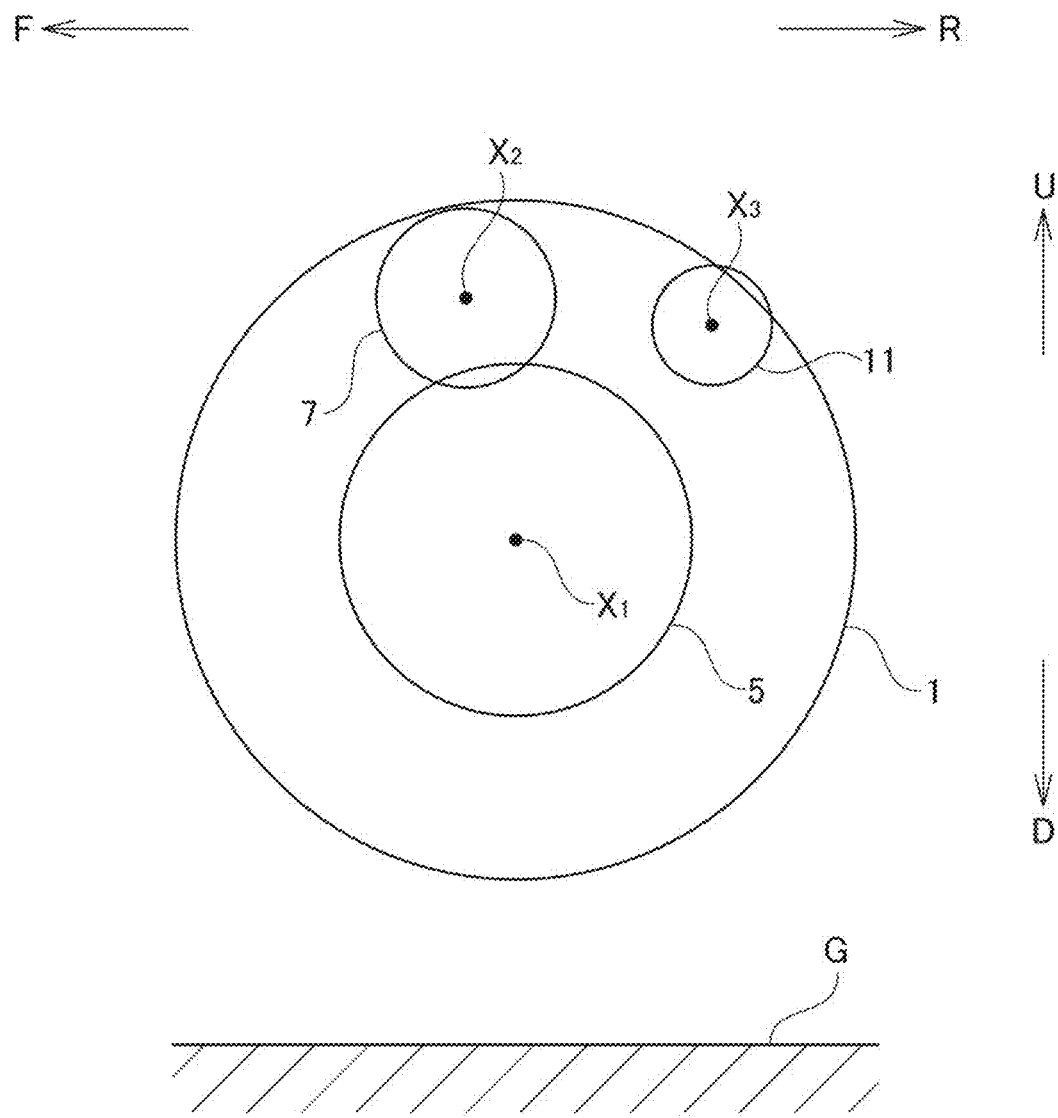
FIG. 3 is a schematic side view of the coaxial drive unit to show a positional relation of three axes.

According to the arrangement as described above, as being readily understood from FIG. 1, the cam mechanism 13 driven by the actuator 11 is disposed close to the center of the unit and overlaps in the axial direction with the clutch 9. The actuator 11 is therefore necessarily not projecting axially from the casings 21, 23. As the third axis X3 lies radially inward relative to the outer periphery of the motor 1 as shown in FIG. 3, the actuator 11 can be disposed generally inward from the outer periphery of the motor 1. The transmission shaft 7 and the actuator 11 can be arranged in any arbitrary location around the first axis X1 but may be disposed at any upper location U above the first axis X1 in the vehicle because the actuator 11, if disposed at any lower location D below the casing 21, is vulnerable to substances incoming from the road. The actuator 11 may be disposed more at a rear location R than a front location F relative to the transmission shaft 7. Then the actuator 11 can be hidden behind the casing 21 from the ground G, thereby avoiding incoming substances from the road.

Figure 4:
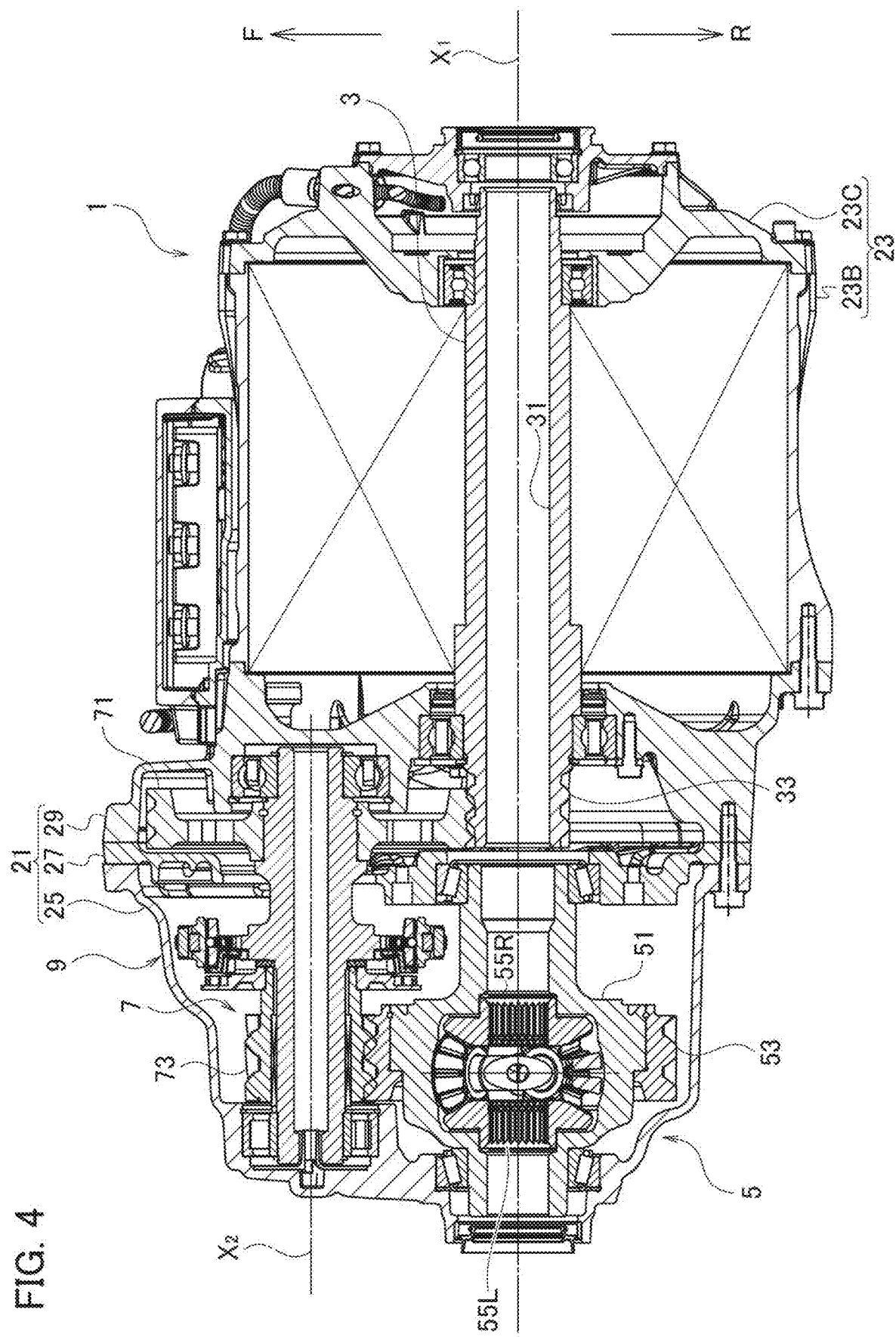
FIG. 4 is a sectional view of a coaxial drive unit according to another embodiment, taken from a plane passing through axes of respective elements.

Based on a similar arrangement, as shown in FIG. 4, another embodiment is possible, in which the clutch 9 is used for the purpose of enabling and cutting torque transmission from the motor 1 to the differential 5.

Figure 5:
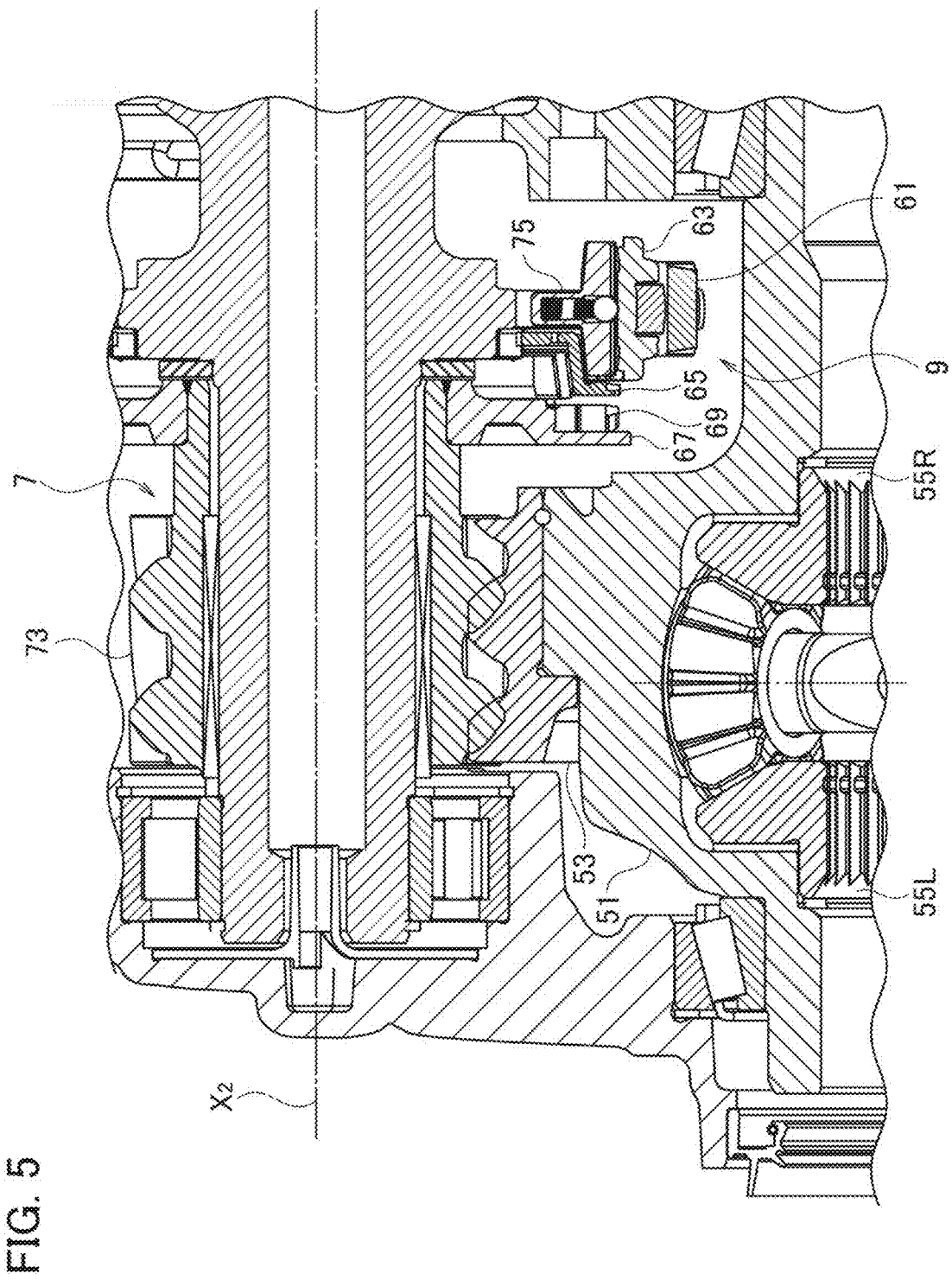
FIG. 5 is an enlarged sectional view of the device of FIG. 4 for mainly showing a clutch.

Referring to FIG. 5 in combination with FIG. 4, the gear section 73 is coaxial with but separate from the transmission shaft 7, thereby being freely rotatable. Lubrication therebetween may be effected only by lubricant oil, or any bearing element such as a needle bearing may be interposed therebetween. The clutch 9 is disposed on the transmission shaft 7, for example between the gear wheel 71 and the gear section 73.

The transmission shaft 7 unitarily has a hub 75 adjoining the gear section 73 and a sleeve 63 is coupled with the outer periphery of the hub 75 by means of spline-coupling. The sleeve 63 rotates along with the hub 75 but is axially movable relative to the hub 75.

With the gear section 73, a cone 67 is coupled. The cone 67 on a face opposed to the sleeve 63 is toothed to have dog teeth 69 so as to mesh with the sleeve 63. When the sleeve 63 moves axially to mesh with the dog teeth 69, rotation of the transmission shaft 7 is transmitted through the sleeve 63 and the cone 67 to the gear section 73. To eliminate difference in rotation speed therebetween in advance of meshing, a synchronizer ring 65 may be interposed. When meshing, torque is transmitted from the motor 1 to the differential 5. When the sleeve 63 is disengaged from the dog teeth 69, rotation is not transmitted and therefore the torque transmission is cut off.

Although not particularly shown, the actuator 11 drives the sleeve 63 axially via a shift fork 61. To convert the rotational motion by the actuator 11 into an axial motion, a cam mechanism 13 similar to the one described already may be used or alternatively a simpler ball screw mechanism may be used. Still alternatively, the actuator 11 may be not a motor creating rotation but a device directly creating linear motion such as a linear motor or a hydraulic actuator.

In any case, the actuator 11 can be disposed close to the transmission shaft 7 and also close to the center of the unit, and further the arrangement of axes such as shown in FIG. 3 can be used. The actuator 11 can be therefore hidden behind the casing 21, thereby avoiding incoming substances from the road.

Although certain exemplary embodiments are described above, modifications and variations of the embodiments will occur to those skilled in the art, in light of the above teachings.

What is claimed is:

1. A coaxial drive unit for driving paired axles rotatable about a first axis, comprising:
   a motor coaxial with the first axis;
   a differential coaxial with the first axis and rotatable about the first axis, the differential including a differential gear set configured to differentially output received torque to the paired axles;
   an output shaft penetrating and driven by the motor to rotate about the first axis, the output shaft having a through-hole so dimensioned as to allow one of the paired axles to reach the differential from an exterior;
   a transmission shaft rotatable about a second axis parallel with the first axis and in mesh with both the output shaft and the differential to transmit the torque from the motor to the differential;
   a clutch disposed between the motor and the differential gear set to limit a differential motion of the differential gear set; and
   an actuator disposed above the first axis and configured to drive the clutch.

2. The drive unit of claim 1, wherein the actuator is disposed along a third axis distinct from the first axis and the second axis and lying inside an outer periphery of the motor in relation to the first axis.

3. The drive unit of claim 2, further comprising:
   a cam mechanism configured to covert a rotational motion into an axial motion to drive the clutch,
   wherein the actuator includes a second motor configured to create a rotational motion about the third axis and a gear set in mesh with the second motor to transmit the rotational motion to the cam mechanism.

4. The drive unit of claim 1, wherein the actuator is so disposed as to overlap in an axial direction with the clutch.

* * * * *